April 24, 1951     U. LAMM ET AL     2,550,569

CONTROL SYSTEM FOR THREE-PHASE MOTORS

Filed Aug. 21, 1947

Inventors.
Uno Lamm and
Marius Böckman
By [signature] Attorney.

Patented Apr. 24, 1951

2,550,569

UNITED STATES PATENT OFFICE 2,550,569

CONTROL SYSTEM FOR THREE-PHASE MOTORS

Uno Lamm and Marius Böckman, Ludvika, Sweden, assignors to Allmänna Svenska Elektriska Aktiebolaget, Vasteras, Sweden, a Swedish corporation Application August 21, 1947, Serial No. 769,944
In Sweden August 29, 1942

Section 1, Public Law 690, August 8, 1946
Patent expires August 29, 1962

1 Claim. (Cl. 318—207)

It is known to operate a three-phase asynchronous motor alternatively in different directions, especially for regulating purposes, by connecting two of the phase terminals of the motor to two poles of the voltage source over two direct current saturable reactors each, which are alternatively magnetized and demagnetized so as to make the connection act as a phase shifter. The present invention relates to means for generally connecting loads to polyphase networks alternatively in different phase sequence by means of such transductors, the characteristic of the invention being that the direct current saturable reactors, hereinafter referred to as transductors, are polarized so as to react directly, without the interconnection of movable parts, to the algebraic difference between an electrical comparison quantity and an electrical directing quantity, in being alternatively magnetized and demagnetized in dependence of the sign of said difference.

Figure 1:
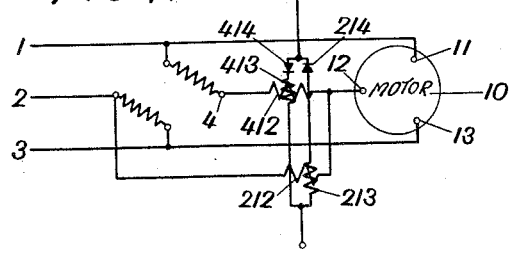
Figure 2:
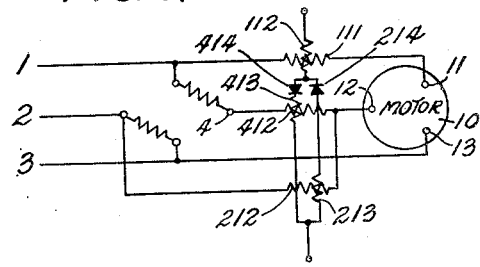

Two forms of the invention are diagrammatically illustrated at Figs. 1 and 2 of the accompanying drawing.

Fig. 1 shows a form of the invention wherein the numerals 1, 2, 3 designate the three poles of a three-phase network and wherein two terminals 11, 13 of the motor 10 are directly connected to each one of two network poles 1, 3. The third motor terminal 12 is, on the contrary, capable of being alternatively connected to the network pole 2 and to an artificial pole 4 so situated as to make the phase sequence 1-4-3 inverse to the phase sequence 1-2-3. This artificial network pole is created by means of a transformer which in its most simple form consists of a single-phase transformer with the ratio 1, the primary winding of which for instance is connected between the poles 2 and 3, while its secondary winding lies between the poles 1 and 4.

Between the network pole 2 and the motor terminal 12 is connected a transductor 212, while between the artificial pole 4 and the motor terminal there is a transductor 412. The transductors each has only one D. C. winding 213, 413 respectively, while the polarisation is effected by oppositely directed blocking valves 214, 414 respectively being connected in series with the two D. C. windings, so that a directing current of one direction acts only on one transductor and a directing current of the other direction only on the other transductor. The comparison current will in this case be 0. This system of polarizing the transductors is of course independent of the manner of connecting the motor terminals to the network poles.

Fig. 2 is similar in all respects to Fig. 1 except that Fig. 2 shows a transductor 111 connected between a network pole 1 and a motor terminal 11. This transductor may be employed if it is desired to prevent a permanent single phase connection of the motor to the network. It has a D. C. winding 112 which is traversed by a current as soon as one of the windings 213, 413 is, i. e. as soon as the motor is intended to start in either direction.

In Figs 1 and 2 the transductors are shown conventionally, being supposed to be arranged in the usual manner with two cores each for compensating the influence on the direct current of the fundamental wave of the alternating current.

The comparison quantity determining the polarisation of the transductors in the examples described need not be identical to the exactly constant comparison quantity determining the accuracy of the electric regulator. For instance, in Fig. 1, a primary regulator may create a directing current which never falls to zero but which varies about a normal value in a much higher degree than the quantity to be regulated. In such a case, the comparison quantity in the aforesaid windings need not be so accurately constant as the normal current of the primary regulator.

It would also be possible to place the transductors described in connection with the figures not direcly between the poles of the motor and of the network, but to cause them to influence separate amplifying transductors connected therebetween.

We claim as our invention:

A control system for controlling the direction of rotation of a three-phase motor by means of a polyphase source of energy, comprising two three-phase systems having two poles in common, one of said three-phase systems having a natural third pole and the other having an artificial third pole in phase opposition to the natural one, and variable reactance means between the third poles of said two three-phase systems and a corresponding pole of said motor, in which the artificial third pole forms the end of a transformer winding connected between said artificial third pole and one of said common poles, said transformer winding having the same core as a transformer winding connected between said natural third pole and the other of said common poles.

UNO LAMM.
MARIUS BÖCKMAN.

REFERENCES CITED

The following references are of record in the file of this patent:

UNITED STATES PATENTS

| Number | Name | Date |
|---|---|---|
| 2,228,078 | Gulliksen | Jan. 7, 1941 |
| 2,386,580 | Wickerham | Oct. 9, 1945 |
| 2,386,581 | Wickerham | Oct. 9, 1945 |